Patented Nov. 16, 1943

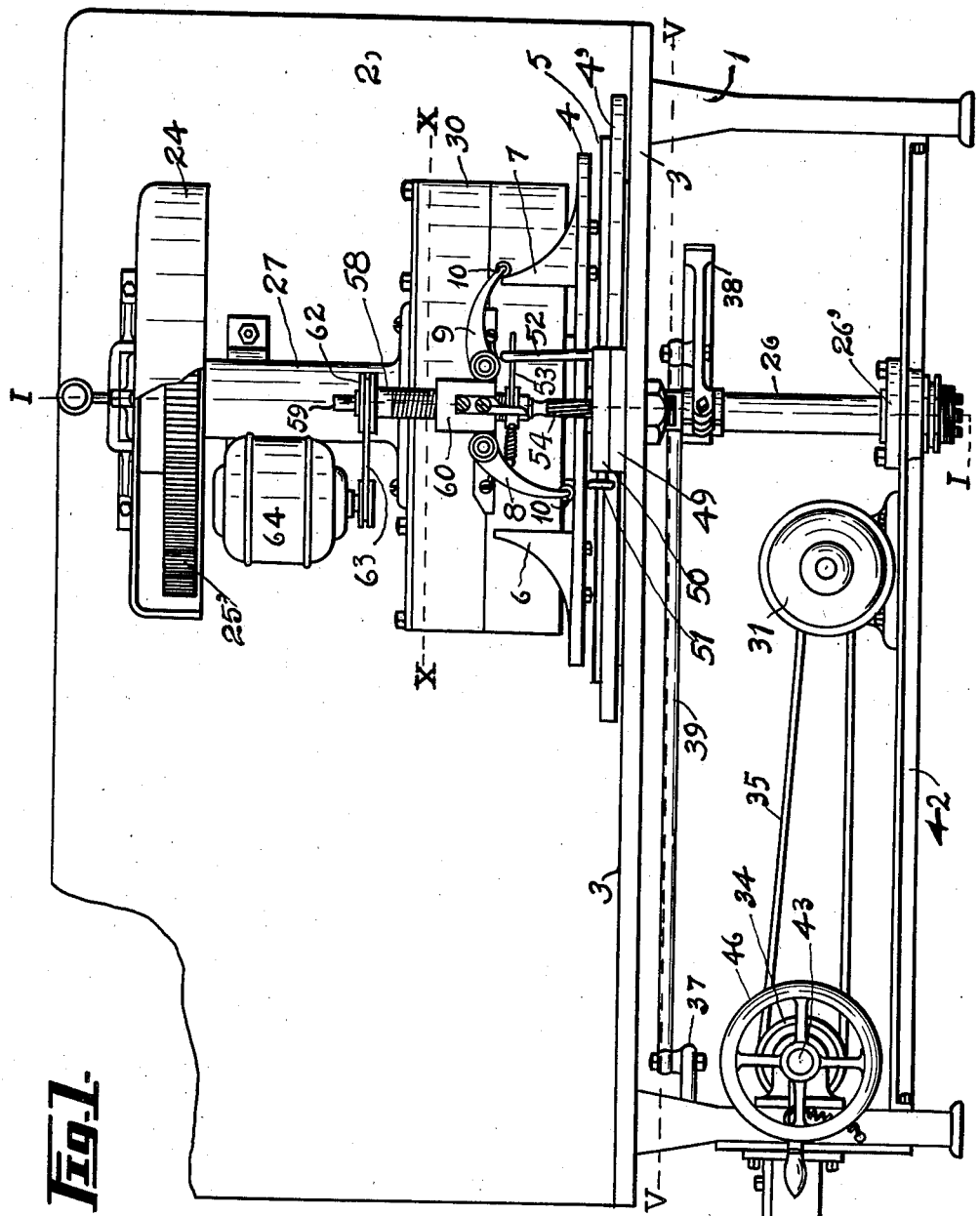

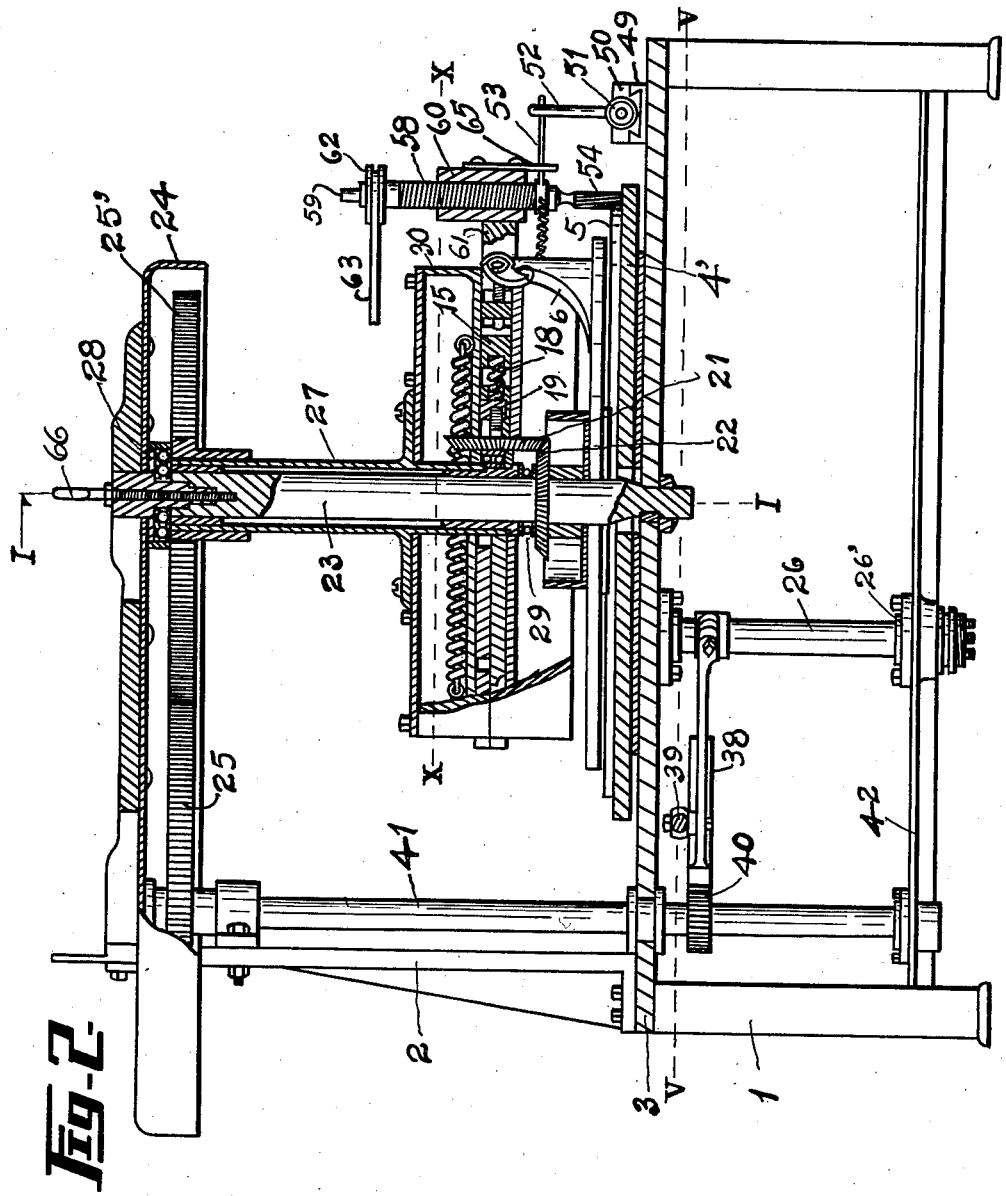

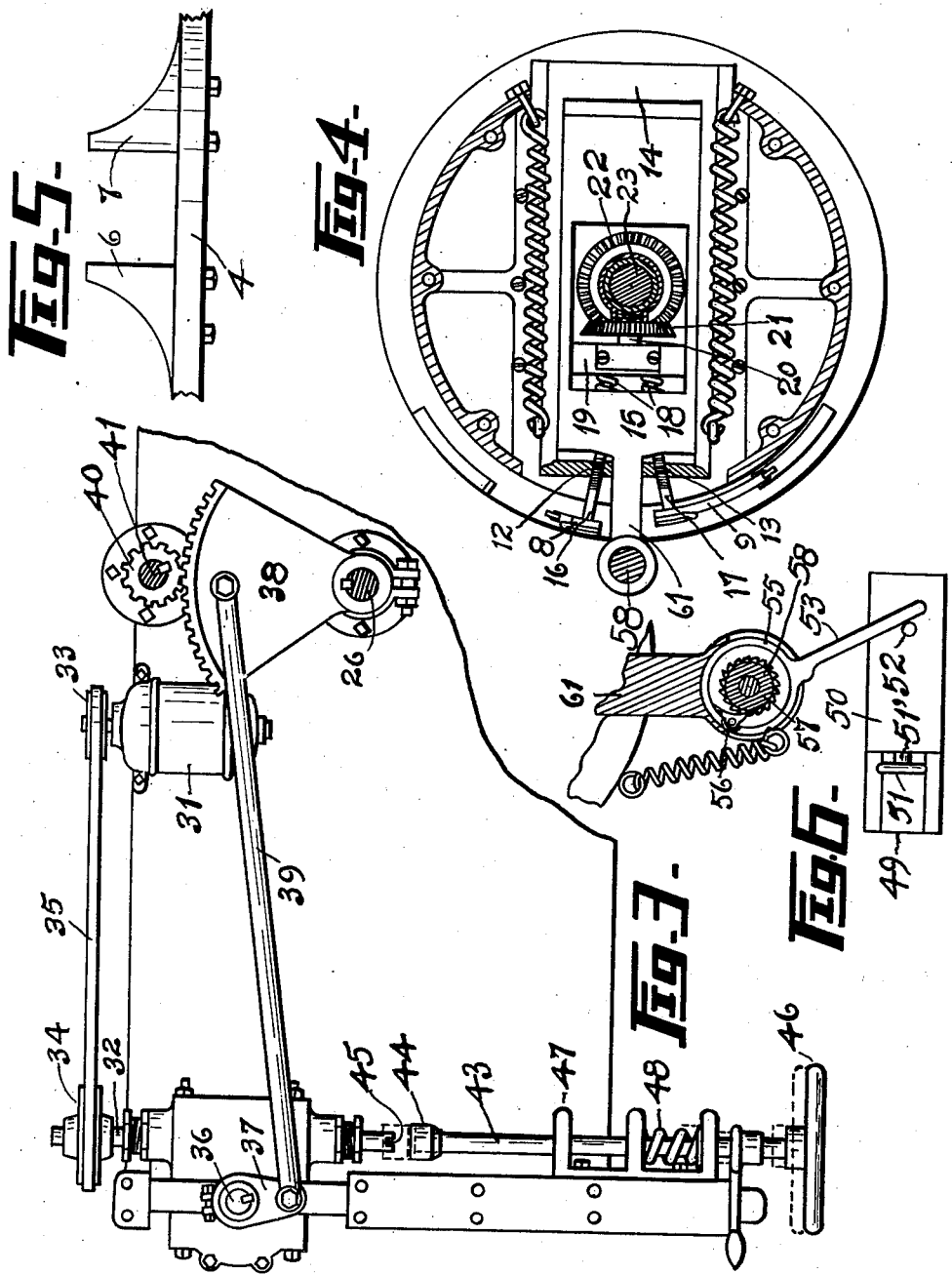

2,334,231

UNITED STATES PATENT OFFICE 2,334,231

MACHINE TOOL

Donald D. Wallace, Muskegon, Mich.

Application February 16, 1940, Serial No. 319,274

5 Claims. (Cl. 90—15)

My present invention relates to improvements in machine tools and particularly to machine tools for the production of circumferential cams and rings for the pistons of engines and the like wherein it is essential that the cams and particularly the piston rings be very accurate so that the piston rings will bear against the wall of the engine's cylinder uniformly throughout their circumference in order that there will be no leakage of fluid pressure within the cylinder past the piston on which the piston rings are mounted. The several objects of improvements are, first, to produce a machine tool whereby cams, piston rings and other circumferential irregular shapes can be produced in exact duplication; second, to provide a machine tool whereby piston rings can be produced having the required peripheral contour for exerting uniform pressure against the cylinder wall throughout the circumference or periphery of the ring; third, to produce a machine tool whereby cams can be produced in exact duplication in large production; and fourth, to provide a machine tool that can be employed in mass production of piston rings cheaply.

These named objects and those objects that appear from a perusal of the following description are attained by the structure disclosed in the accompanying drawings, in which:

Figure 1 is a front elevation view of my improved machine tool for producing cams and piston rings, in which a portion of the upper gear housing is broken out in order that parts therein can be described.

Figure 2 is a sectional elevation view of my improved machine tool, the view being taken on line I—I of Figure 1, the greater portion of the view being in section in order that the parts thereby disclosed may be described.

Figure 3 is a plan view of the work turning mechanism as taken on line V—V of Figure 1, and looking downwardly from said line.

Figure 4 is a plan view of the tool supporting head and the mechanism by which the head is operated to feed the tool to the work while being operated upon, the housing therefore being shown in section taken on line X—X of Figure 1, and Figure 2.

Figure 5 is an elevation view of the cams by which the horizontal feed movement of the milling cutter tool is moved to the work while the machine is operating in machining the outer periphery of the work piece.

Figure 6 is a view looking downwardly on the vertical feed mechanism of the milling cutter.

Throughout the drawings, similar numerals refer to similar parts, and referring thereto:

Numeral 1 designates the frame by which the mechanism of the machine is supported; 2 the back of the machine; 3 the top platen of the machine frame; 4 the platen plate upon which is supported the horizontal feed cams; 4' the platen upon which is supported the work that is being machined; 5 the work being machined, which is shown as a piston ring. 6 and 7 are the cams whereby the horizontal feed is accomplished through the cam followers 8 and 9 which follow the contour of the cams and thereby move the cutting tool toward and away from the work as the cutting tool is swung around the work. Each follower has at its cams engaging end an anti-friction roller 10 by which friction and wear on the cams are minimized. The followers each have extending rearwardly from them, bearings 12 and 13 supported by slidable frame 14, having an extension carrying the cutter head 15, has extending therethrough screw threaded studs 16 and 17 turned by the cam follower levers 8 and 9, the head 15 is moved either toward the work against the tension of the springs 18, or away from the work. These tension springs 18 are carried by cross-member 19 slidable in head 15 and have screw-threaded therein horizontally extending screw-threaded stud 20 forming the supporting shaft carrying the feed gear 21, engaging gear 22, secured to the stationary vertically disposed shaft 23, which is supported at its lower end by frame plate 3 and at its upper end by gear housing 24, having therein drive gears 25 and 25' for driving the hollow shaft 27 rotatable in bearing 28 at its top and in bearing 29 at its lower end, and by a flange intermediate its ends, carries and rotates or oscillates the housing 30 having therein the cutter feed mechanism.

Referring to Fig. 3, the electric motor 31 drives the shaft 32 through pulleys 33 and 34 by belt 35, the shaft 32 having thereon a worm gear of a suitable design, whereby the vertical shaft 36, having secured to it crank 37, is rotated and in so doing oscillates gear segment 38 through connecting rod 39. The segment gear 38 engages gear 40 on the vertical shaft 41 to which the gear 25 is secured, and the gears 25 and 25' are supported in suitable bearings within the housing 24. The gear 25, engaging gear 25' which is secured to the hollow shaft 27, oscillates the feed mechanism enclosing housing 30 and the cutter feed mechanism therein. Shaft 26 is supported at its lower end by bearing 26' in turn supported by the lower rail 42 of the machine frame 1. Horizontal shaft 43, having thereon clutch member 44 for engaging the slot 45 of the shaft 32, serves to turn the shaft 32 by hand while the machine is being adjusted and set for power operation, during which time the hand wheel 46 serves to rotate the shaft 32 which is slidable in the supporting brackets 47 when forced longitudinally against the helical springs 48, whereby the clutch member 44 is held out of engagement with the slot 45 in the end of shaft 32.

Numeral 49 refers to a slide-way having slidable therein, for adjusting the time that the cutter reaches the end of the cut in one direction, the carriage 50 adjustable longitudinally of the slide-way 49 for timing the end of the cut of the cutter which adjustment is made by hand wheel 51 having extending therefrom through the carriage 50 or nut thereof, screw-threaded stud 51'. The carriage 50 has extending upwardly from its top, rod 52 which engages the horizontally extending rod 53 for operating the down or vertical feed mechanism, as shown in Figure 6 of the drawings, and which is operated for feeding the cutter 54 downward. The said rod 53, extending from ratchet head 55, has therein ratchet pawl 56 engaging ratchet wheel 57 which is secured to the externally screw-threaded bearing member 58 for the cutter spindle 59 carrying the cutter 54 and rotatable in bearing member 58. The said bearing member 58 is screw-threaded through bearing nut 60 of the extension 61 of the head 15 slidable in frame 14. The spindle 59, carrying the cutter 54, is rotated by pulley 62 secured to the spindle and is driven by belt 63 in turn driven by electric motor 64. Downwardly extending rod 65, secured to the nut 60, serves as a stop for the horizontally extending ratchet operating rod 53. Numeral 66 represents an eyebolt screw-threaded into the vertical shaft 23 and serves to lift the heavier portion of the machine from the frame and plate 3.

Piston rings have heretofore been produced by first preparing a circular blank of cast iron, the approximate thickness of the finished piston ring, either by casting a cylinder of considerable length and cutting the ring blank therefrom, or by casting each blank individually; cutting through the blank to produce two free ends with the required gap between the ends, springing the ring until the two free ends contacted each other; clamping one or more of the ring blanks between annular flanges having about the same diameter as that of the finished ring, and while clamped, mounting the whole in a lathe and machining the blank to the diameter desired that would fit the diameter of the cylinder bore of the engine for which the ring was intended. Piston rings produced by the method above described, when mounted on a piston within the bore of a cylinder, do not contact the wall of the cylinder throughout the circumference of the ring. There are gaps at different places between the ring and the cylinder wall through which leakage of pressure will take place, thereby causing a waste of pressure energy. Should the ring by chance contact the cylinder wall throughout its circumference, the pressure with which it contacts the cylinder wall will not be uniform and therefore pressure will generate between the periphery of the ring and the cylinder wall, which pressure will cause the ring to spring inwardly, thus leaving a gap through which the pressure will leak past the ring and cause a reduction in effective pressure against the piston head and, as in internal combustion engines, will not only cause a reduction in horsepower of the engine, but also an increase in fuel consumed.

In the production of piston rings with my improved machine tool, before starting production of piston rings of a given size, I first machine a ring to approximately the required circumferential form, and fit that ring into the cylinder of a diameter the ring is intended for until the ring bears with the required or uniform pressure against the cylinder wall. From this master ring, I generate the cams 6 and 7 to a form that will move the milling cutter 59 horizontally in and out as it is swung around the ring and carried by the extension 61 of the head 15. This in-and-out movement of the cutter, combined with its circuit around the ring, produces by the rotation of the milling cutter, a piston ring in duplicate of the master ring, a piston ring that exactly will fit the cylinder and exert uniform pressure throughout its circumference. However, should it be desired to cause more or less pressure against the cylinder wall by the piston ring, the cams 6 and 7 can be altered until the desired pressures are obtained. In the milling cutter's circuit around the ring blank, which is secured to the platen 4' of the machine, it is fed downwardly by stud 53 extending upward from adjustable carriage 50 and engaging the ratchet rod 52, swings the rod 53 as the cutter head 15 is turned and thereby operates the feed ratchet mechanism and turns the externally screw-threaded bearing member 58, thereby screwing the bearing downwardly thereby feeding the milling cutter downward until the whole outer periphery of the ring blank is machined and a piston ring of desired circumferential cam form is completed. From the above description, it will be seen that all piston rings produced by the machine employing the same feed cams will be exact duplicates, and of an exterior circumference conforming to the shape for which the cams 6 and 7 were generated or shaped to produce by the rollers 10 swinging the arms 8 and 9, and thereby turning screw-threaded studs 16 and 17, of which stud 16 has a right hand thread and the stud 17 a left hand thread, the stud 16 by reason of its right hand thread, moves the head 15 and cutter 59 by extension 61 and bearing 58 and spindle 59' towards the work being machined when the arm 8 is raised by the roller 10 traversing the cam 6, and the stud 17 by the left hand thread thereon, moving the cutter 59 likewise to stud 16, but outward and away from the work, thus it will be seen, a ring of any reasonable peripheral cam form can be machined by the provision of the desired shaped cams 6 and 7.

It is to be understood that the cams 6 and 7 employed when machining a piston ring are of sufficient length to relieve the ends of the piston ring blank only, and when machining cams of irregular shape the cams 6 and 7 are of sufficient length to feed the cutter 54 toward or away from the work in response to the shape of the cam being machined, which when machining a heart shaped cam, each of the cams 6 and 7 would be equal to one half the peripheral length of the cam, and should the cam to be machined have a wave peripherical form, the cam 6 would have the form of one half the peripheral length of the cam being machined while the cam 7 would have the form of the second half of the periphery of the cam to be machined; therefore, cams or rings of any peripheral can be machined by proceeding the cams 6 and 7 of a suitable form.

Having described my improved machine tool for producing piston rings and other exterior cam-like structures, I claim:

1. In a machine tool of the class described, in combination with a supporting frame having a top plate member, a work supporting platen and a vertically extending stationary shaft secured to the said top plate and having secured thereto a stationary miter gear adjacent the lower end thereof; a tubular shaft surrounding the said stationary shaft and rotatable in bearings supported by said stationary shaft; a cutter feed mechanism housing carried by the said tubular shaft and having therein a slidable frame movable in one direction by a pair of helical tension springs and having extending through one of its ends a pair of screw-threaded studs whereby is moved a slidable head within the said frame, having thereon a cutter supporting extension, the said head being slidable in the opposite direction by a miter gear having a screw-threaded shaft engaged by the stationary miter gear supported on the vertically disposed stationary shaft and yieldingly secured to the first named head having the said cutter supporting extension carrying a down feedable externally screw-threaded cutter spindle bearing sleeve turnable by a ratchet only a portion of its circumference at each circuit scribed by the cutter supporting extension and head thereof; the said ratchet feed mechanism comprising a slideway secured to the top plate of the machine; a slidable carriage adjustable longitudinally of the slideway by a manually operable screw and having an upwardly extending post for engaging a horizontally extending rod carried by the housing of the ratchet paul for turning the said bearing sleeve by the screw threads thereof feeding the said sleeve and cutter downwardly; a spur gear secured to the aforesaid tubular shaft above the feed mechanism housing thereon, for rotatably oscillating the said housing; a second spur gear engaging the first named spur gear and secured to a vertically disposed shaft having thereon below the top plate of the machine a smaller spur gear whereby the said shaft is turned; a segment gear engaging the said smaller gear for rotary oscillation of said smaller gear; a crank pin on said segment gear engaging a connecting rod extending therefrom to a horizontally rotated crank secured to a vertical shaft extending from a reducing gear mechanism associated with a horizontally disposed shaft having thereon a pulley driven by a belt extending from a motor; a second horizontally disposed shaft slidable in a supporting bracket on the machine's frame for clutch engagement with the first named horizontally disposed shaft and having thereon a hand wheel for engaging and turning the first named horizontally disposed shaft for setting the machine for operation on the work to be machined, and cam plate located above the aforesaid work supporting platen having thereon cams for sliding the aforesaid cutter extension supporting head by the aforesaid screw threads extending through the aforesaid frame and turned by cam follower levers engaging and raised by the said cams as the feed mechanism housing is oscillated.

2. In a machine tool of the class described, in combination with a supporting frame having a top plate member, a work supporting platen and a vertically extending stationary shaft secured to the said top plate and having secured thereto a stationary miter gear adjacent the lower end thereof; a tubular shaft surrounding the said stationary shaft and rotatable in bearings supported by said stationary shaft; a cutter feed mechanism housing carried by the said tubular shaft and having therein a slidable frame movable in one direction by a pair of helical tension springs having extending through one of its ends a pair of screw-threaded studs, whereby is moved a slidable head within the said frame, having thereon a cutter supporting extension, the said head being slidable in the opposite direction by a miter gear having a screw-threaded shaft engaged by the stationary miter gear supported on the vertically disposed stationary shaft and yieldingly secured to the first named head having the said cutter supporting extension carrying a down feedable externally screw-threaded cutter spindle bearing sleeve turnable by a ratchet only a portion of its circumference at each circuit scribed by the cutter supporting extension and head thereof; the said ratchet feed mechanism comprising a slideway secured to the top plate of the machine; a slidable carriage adjustable longitudinally of the slideway by a manually operable screw and having an upwardly extending post for engaging a horizontally extending rod carried by the housing of the ratchet paul for turning the said bearing sleeve and by the screw threads thereof feeding the said sleeve and cutter downwardly; a spur gear secured to the aforesaid tubular shaft above the feed mechanism housing thereon, for rotatably oscillating the said housing; a second spur gear engaging the first named spur gear and secured to a vertically disposed shaft having thereon below the top plate of the machine a smaller spur gear whereby the said shaft is turned; a segment gear engaging the said smaller gear for rotary oscillation of said smaller gear; a crank pin on said segment gear engaging a connecting rod extending therefrom to a horizontally rotated crank secured to a vertical shaft extending from a reducing gear mechanism associated with a horizontally disposed shaft having thereon a pulley driven by a belt extending from a motor.

3. In a machine tool of the class described, in combination with a supporting frame having a top plate member, a work supporting platen and a vertically extending stationary shaft secured to the said top plate and having secured thereto a stationary miter gear adjacent the lower end thereof; a tubular shaft surrounding the said stationary shaft and rotatable in bearings supported by said stationary shaft; a cutter feed mechanism housing carried by the said tubular shaft and having therein a slidable frame movable in one direction by a pair of helical tension springs and having extending through one of its ends a pair of screw threaded studs, whereby is moved a slidable head within the said frame, having thereon a cutter supporting extension, the said head being slidable in the opposite direction by a miter gear having a screw-threaded shaft engaged by the stationary miter gear supported on the vertically disposed stationary shaft and yieldingly secured to the first named head having the said cutter supporting extension carrying a down feedable externally screw-threaded cutter spindle bearing sleeve turnable by a ratchet only a portion of its circumference at each circuit scribed by the cutter supporting extension and head thereof; the said ratchet feed mechanism comprising a slideway secured to the top plate of the machine; a slidable carriage adjustable longitudinally of the slideway by a manually operable screw and having an upwardly extending post for engaging a horizontally extending rod carried by the housing of the ratchet paul for turning the said bearing sleeve and by the screw threads thereof feeding the said sleeve and cutter downward.

4. In a machine tool of the class described, in combination with a supporting frame having a top plate member, a work supporting platen and a vertically extending stationary shaft secured to the said top plate and having secured thereto a stationary miter gear adjacent the lower end thereof; a tubular shaft surrounding the said stationary shaft and rotatable in bearings supported by said stationary shaft; a cutter feed mechanism housing carried by the said tubular shaft and having therein a slidable frame movable in one direction by a pair of helical tension springs and having extending through one of its ends a pair of screw-threaded studs, whereby is moved a slidable head within the said frame, having thereon a cutter supporting extension, the said head being slidable in the opposite direction by a miter gear having a screw-threaded shaft engaged by the stationary miter gear supported on the vertically disposed stationary shaft and yieldingly secured to the first named head having the said cutter supporting extension carrying a down feedable externally screw-threaded cutter spindle bearing sleeve turnable by a ratchet only a portion of its circumference at each circuit scribed by the cutter supporting extension and head thereof.

5. In a machine tool of the class described, in combination with a supporting frame having a top plate member, a work supporting platen and a vertically extending stationary shaft secured to the said top plate and having secured thereto a stationary miter gear adjacent the lower end thereof; a tubular shaft surrounding the said stationary shaft and rotatable in bearings supported by said stationary shaft; a cutter feed mechanism housing carried by the said tubular shaft and having therein a slidable frame movable in one direction by a pair of helical tension springs and having extending through one of its ends a pair of screw-threaded studs, whereby is moved a slidable head within the said frame, having thereon a cutter supporting extension.

DONALD D. WALLACE.